US012604246B2

(12) United States Patent
Shafin et al.

(10) Patent No.: US 12,604,246 B2
(45) Date of Patent: Apr. 14, 2026

(54) CHANNEL SWITCHING FOR MULTI-LINK DEVICES

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Yue Qi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/523,818

(22) Filed: Nov. 29, 2023

(65) Prior Publication Data

US 2024/0298231 A1     Sep. 5, 2024

Related U.S. Application Data

(60) Provisional application No. 63/451,489, filed on Mar. 10, 2023, provisional application No. 63/449,888, filed on Mar. 3, 2023.

(51) Int. Cl.
*H04W 36/06* (2009.01)
*H04W 72/0453* (2023.01)

(52) U.S. Cl.
CPC ....... *H04W 36/06* (2013.01); *H04W 72/0453* (2013.01)

(58) Field of Classification Search
CPC ..................... H04W 36/06; H04W 72/0453
USPC ........................................ 370/331
See application file for complete search history.

(56) References Cited

U.S. PATENT DOCUMENTS

| | | |
|---|---|---|
| 11,595,884 B2 | 2/2023 | Seok et al. |
| 11,601,999 B2 | 3/2023 | Chu et al. |
| 11,652,912 B2 | 5/2023 | Kim et al. |

(Continued)

OTHER PUBLICATIONS

IEEE Draft Standard for Information technology—Telecommunications and information exchange between systems Local and metropolitan area networks—Specific requirements—Part 11 in IEEE P802.11be/D3.0, Jan. 2023 , vol. No., pp. 1-999, Mar. 1, 2023 (Year: 2023).*

(Continued)

*Primary Examiner* — Marnie A Matt

(57) ABSTRACT

A method performed by a non-AP MLD that comprises STAs, the method comprising: communicating, via a first STA, with a corresponding AP of an AP MLD; receiving information associated with a channel switching operation from the AP MLD, the information based on data associated with a moving average of one or more parameters that are associated with channel congestion or link quality; determining to initiate the channel switching operation, wherein a first STA will switch from a first channel to a second channel on a first link; instructing the first STA to communicate with a first AP on the second channel when communication over the second channel would be improved compared to communication over the first channel; and instructing the first STA to continue communicating with the first AP on the first channel when communication over the second channel would not be improved compared to communication over the first channel.

20 Claims, 13 Drawing Sheets

(56) References Cited

U.S. PATENT DOCUMENTS

| | | | | |
|---|---|---|---|---|
| 11,758,518 | B2* | 9/2023 | Lee | H04W 72/0453 |
| | | | | 370/329 |
| 2017/0280456 | A1* | 9/2017 | Ro | H04W 24/08 |
| 2021/0250848 | A1* | 8/2021 | Seok | H04W 48/16 |
| 2021/0282210 | A1* | 9/2021 | Liu | H04W 52/0235 |
| 2022/0159555 | A1* | 5/2022 | Cariou | H04W 48/12 |
| 2022/0247518 | A1* | 8/2022 | Babaei | H04L 1/1861 |
| 2022/0361193 | A1* | 11/2022 | Fang | H04W 4/90 |
| 2022/0417809 | A1 | 12/2022 | Kneckt et al. | |
| 2023/0156492 | A1 | 5/2023 | Gan et al. | |
| 2023/0217271 | A1 | 7/2023 | Kim et al. | |
| 2023/0262822 | A1* | 8/2023 | Lu | H04W 36/20 |
| | | | | 370/328 |
| 2025/0023649 | A1* | 1/2025 | Wu | H04B 17/309 |
| 2025/0063619 | A1* | 2/2025 | Kim | H04W 76/15 |

OTHER PUBLICATIONS

IEEE P802.11be—D3.0; Draft Standard for Information Technology—Telecommunications and Information exchange between Systems Local and Metropolitan Area Networks—Specific Requirements; "Part 11: Wireless LAN Medium Access Control (MAC) and Physical Layer (PHY) Specifications—Amendment 8: Enhancements for extremely high throughput (EHT)" Jan. 2023, 999 pages.
IEEE P802.11-REVme™/D2.1; Draft Standard for Information Technology—Telecommunications and Information exchange between Systems Local and Metropolitan Area Networks—Specific Requirements; "Part 11: Wireless LAN Medium Access Control (MAC) and Physical Layer (PHY) Specifications," Jan. 2023, 5803 pages.

* cited by examiner

Channel Switch Announcement element

| Element ID | Length | Channel Switch Mode | New Channel Number | Channel Switch Count |
|------------|--------|---------------------|--------------------|----------------------|

Octets:     1         1         1         1         1

Extended Channel Switch element

| Element ID | Length | Channel Switch Mode | New Operating Class | New Channel Number | Channel Switch Count |
|------------|--------|---------------------|---------------------|--------------------|----------------------|

Octets:     1         1         1         1         1         1

600

TV MLD
(as Mobile
AP MLD)

Speaker

Channel 1

700

TV MLD
(as Mobile
AP MLD)

OC MLD

Channel 1    Link 1
(affected link)
Link 2

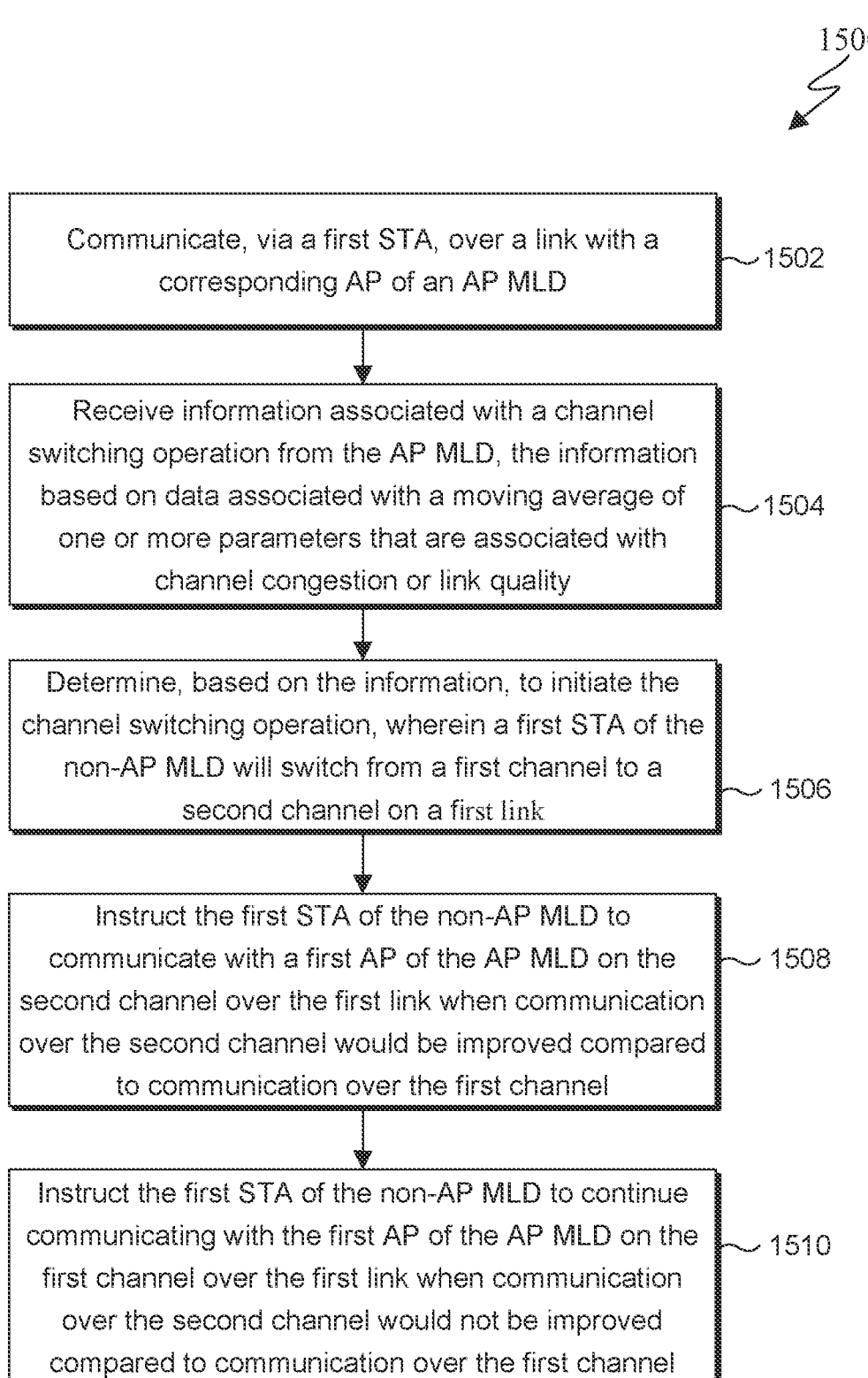

1500

Communicate, via a first STA, over a link with a corresponding AP of an AP MLD ～1502

Receive information associated with a channel switching operation from the AP MLD, the information based on data associated with a moving average of one or more parameters that are associated with channel congestion or link quality ～1504

Determine, based on the information, to initiate the channel switching operation, wherein a first STA of the non-AP MLD will switch from a first channel to a second channel on a first link ～1506

Instruct the first STA of the non-AP MLD to communicate with a first AP of the AP MLD on the second channel over the first link when communication over the second channel would be improved compared to communication over the first channel ～1508

Instruct the first STA of the non-AP MLD to continue communicating with the first AP of the AP MLD on the first channel over the first link when communication over the second channel would not be improved compared to communication over the first channel ～1510

FIG. 15

CHANNEL SWITCHING FOR MULTI-LINK DEVICES

CROSS-REFERENCE TO RELATED APPLICATION AND CLAIM OF PRIORITY

This application claims priority under 35 U.S.C. § 119(e) to U.S. Provisional Patent Application No. 63/449,888 filed on Mar. 3, 2023, and U.S. Provisional Patent Application No. 63/451,489 filed on Mar. 10, 2023, which are hereby incorporated by reference in their entirety.

TECHNICAL FIELD

This disclosure relates generally to transmission efficiency in wireless communications systems that include multi-link devices. Embodiments of this disclosure relate to methods and apparatuses for channel switching for multi-link devices.

BACKGROUND

Wireless local area network (WLAN) technology allows devices to access the internet in the 2.4 GHz, 5 GHZ, 6 GHZ, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for channel switching for multi-link devices.

In one embodiment, an access point (AP) multi-link device (MLD) (AP MLD) is provided, comprising: access points (APs), each comprising a transceiver configured to communicate over a link with a corresponding station (STA) of a non-AP MLD. The AP MLD further comprises a processor operably coupled to the transceiver, the processor configured to: obtain information associated with a channel switching operation, the information including data associated with a moving average of one or more parameters that are associated with channel congestion or link quality; determine, based on the information, to initiate the channel switching operation, wherein a first AP of the AP MLD will switch from a first channel to a second channel on a first link; instruct the first AP of the AP MLD to communicate with a first STA of the non-AP MLD on the second channel over the first link when communication over the second channel would be improved compared to communication over the first channel; and instruct the first AP of the AP MLD to continue communicating with the first STA of the non-AP MLD on the first channel over the first link when communication over the second channel would not be improved compared to communication over the first channel.

In another embodiment, a non-AP MLD is provided, comprising: STAs, each comprising a transceiver configured to communicate over a link with a corresponding AP of an AP MLD. The non-AP MLD further comprises a processor operably coupled to the transceiver, the processor configured to: receive, via at least one of the transceivers, information associated with a channel switching operation from the AP MLD, the information based on data associated with a moving average of one or more parameters that are associated with channel congestion or link quality; determine, based on the information, to initiate the channel switching operation, wherein a first STA of the non-AP MLD will switch from a first channel to a second channel on a first link; instruct the first STA of the non-AP MLD to communicate with a first AP of the AP MLD on the second channel over the first link when communication over the second channel would be improved compared to communication over the first channel; and instruct the first STA of the non-AP MLD to continue communicating with the first AP of the AP MLD on the first channel over the first link when communication over the second channel would not be improved compared to communication over the first channel.

In yet another embodiment, a method for wireless communication performed by a non-AP MLD that comprises STAs, the method comprising: communicating, via a first STA, over a link with a corresponding AP of an AP MLD; receiving information associated with a channel switching operation from the AP MLD, the information based on data associated with a moving average of one or more parameters that are associated with channel congestion or link quality; determining, based on the information, to initiate the channel switching operation, wherein a first STA of the non-AP MLD will switch from a first channel to a second channel on a first link; instructing the first STA of the non-AP MLD to communicate with a first AP of the AP MLD on the second channel over the first link when communication over the second channel would be improved compared to communication over the first channel; and instructing the first STA of the non-AP MLD to continue communicating with the first AP of the AP MLD on the first channel over the first link when communication over the second channel would not be improved compared to communication over the first channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "con- nected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer pro- grams, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other commu- nication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are pro- vided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclo- sure and its advantages, reference is now made to the following description taken in conjunction with the accom- panying drawings, in which like reference numerals repre- sent like parts.

4

Figure 2A:
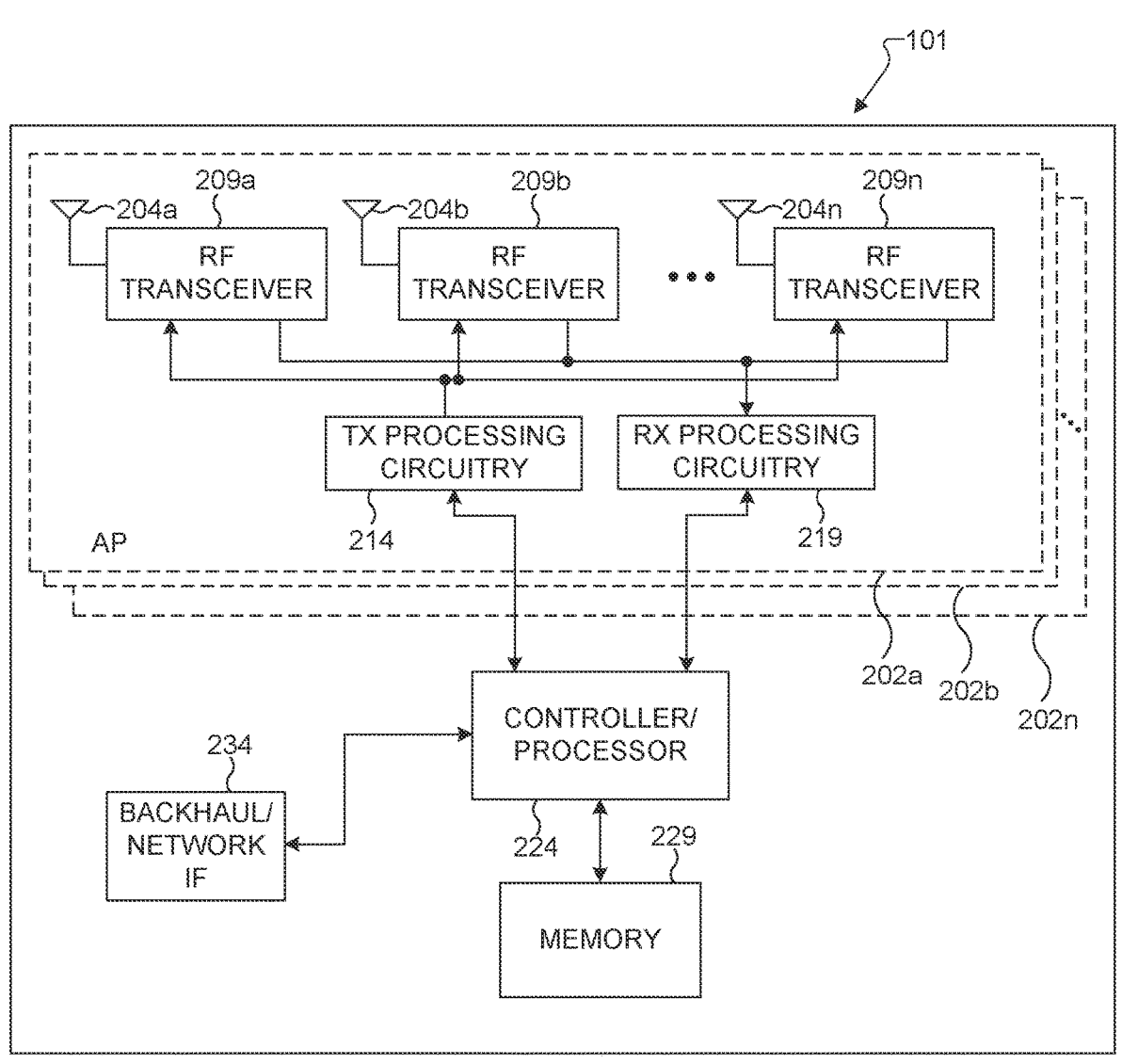
FIG. 2A illustrates an example AP according to embodi- ments of the present disclosure.
Figure 2B:
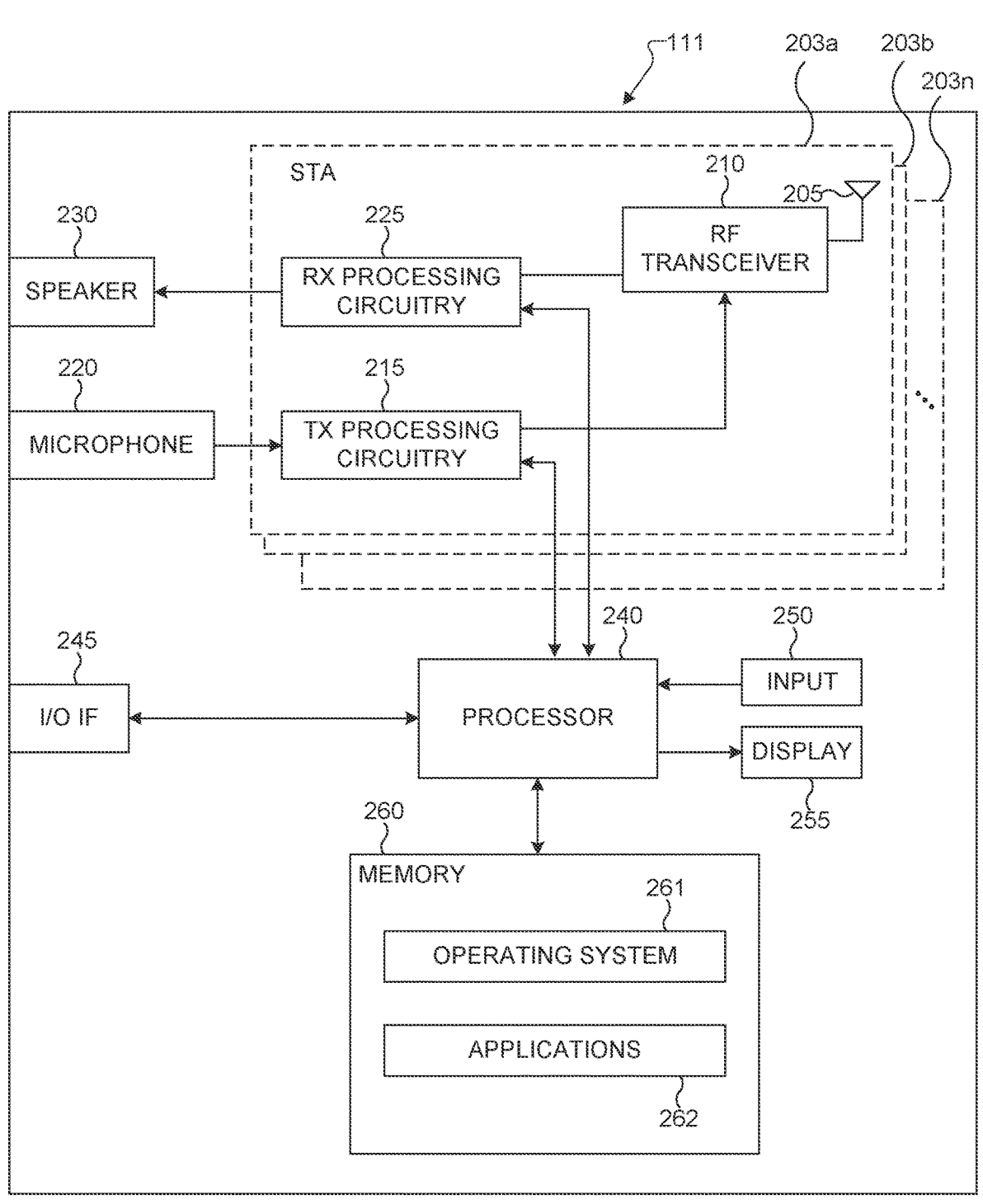
Figure 3:
Figure 4:
Figure 5:
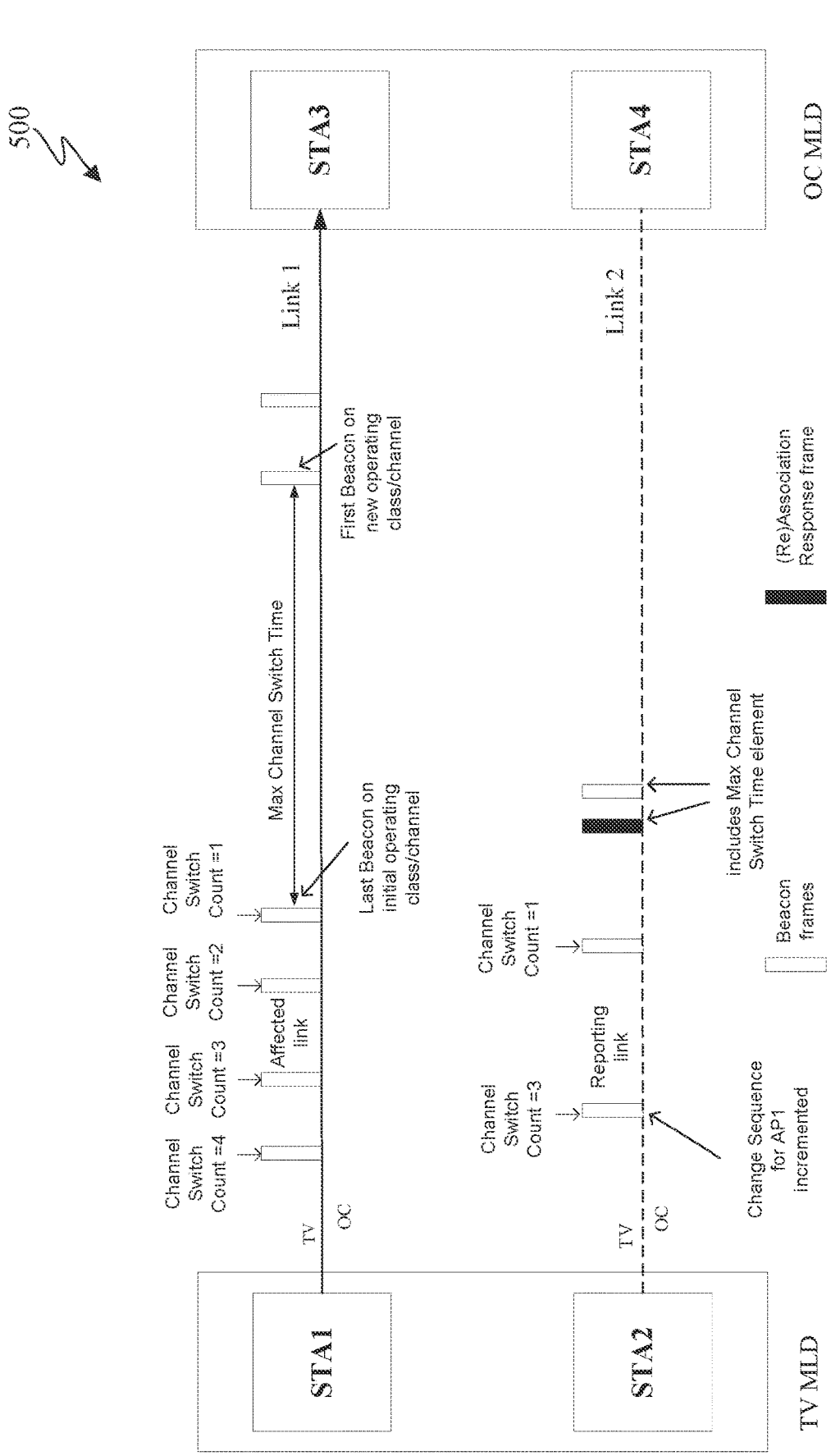
Figure 6:
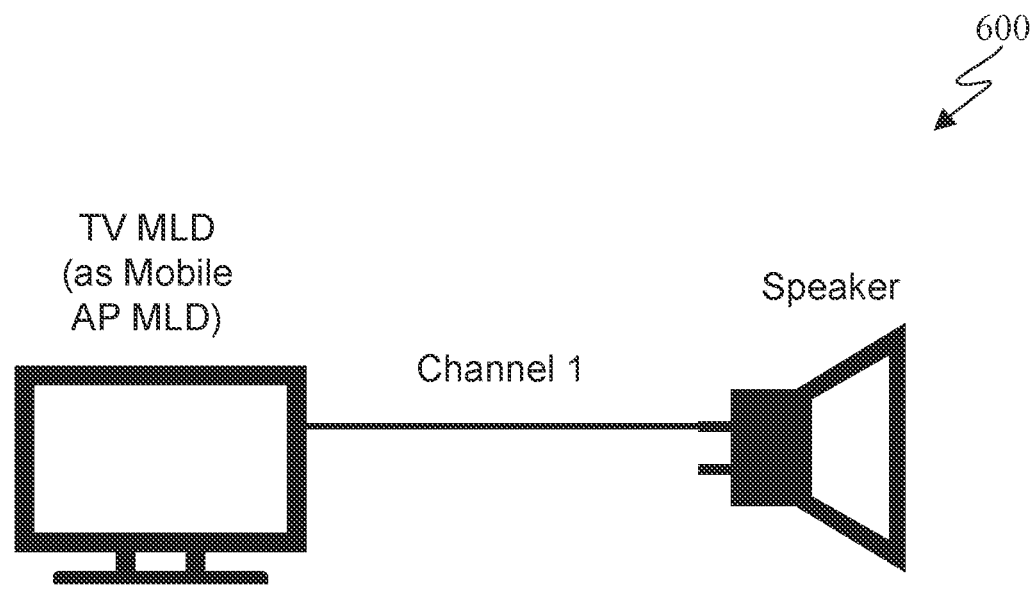
Figure 7:
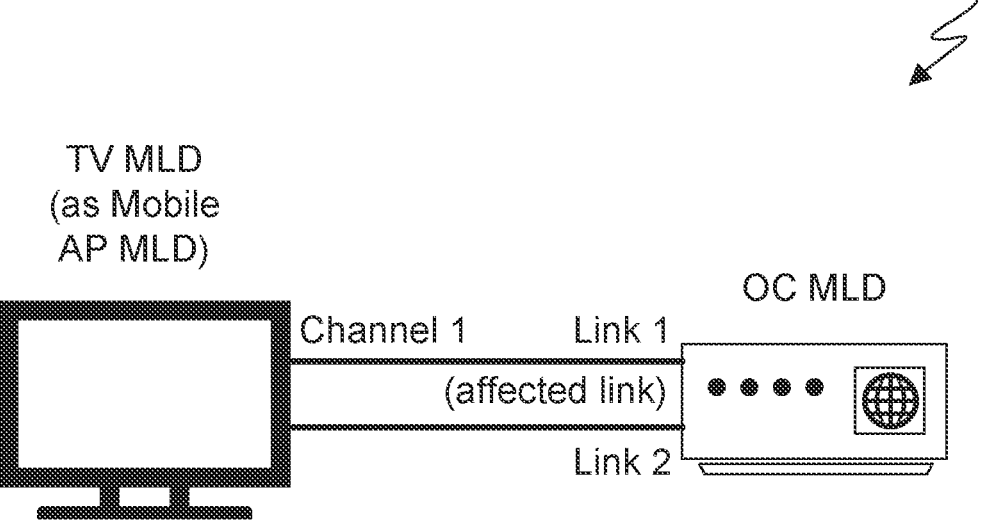
Figure 8:
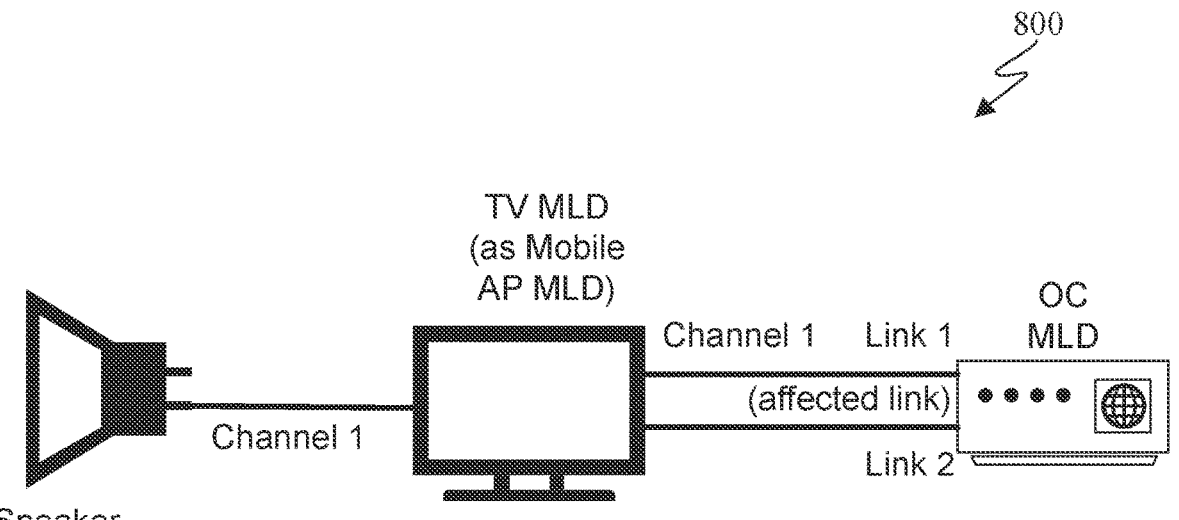
Figure 9:
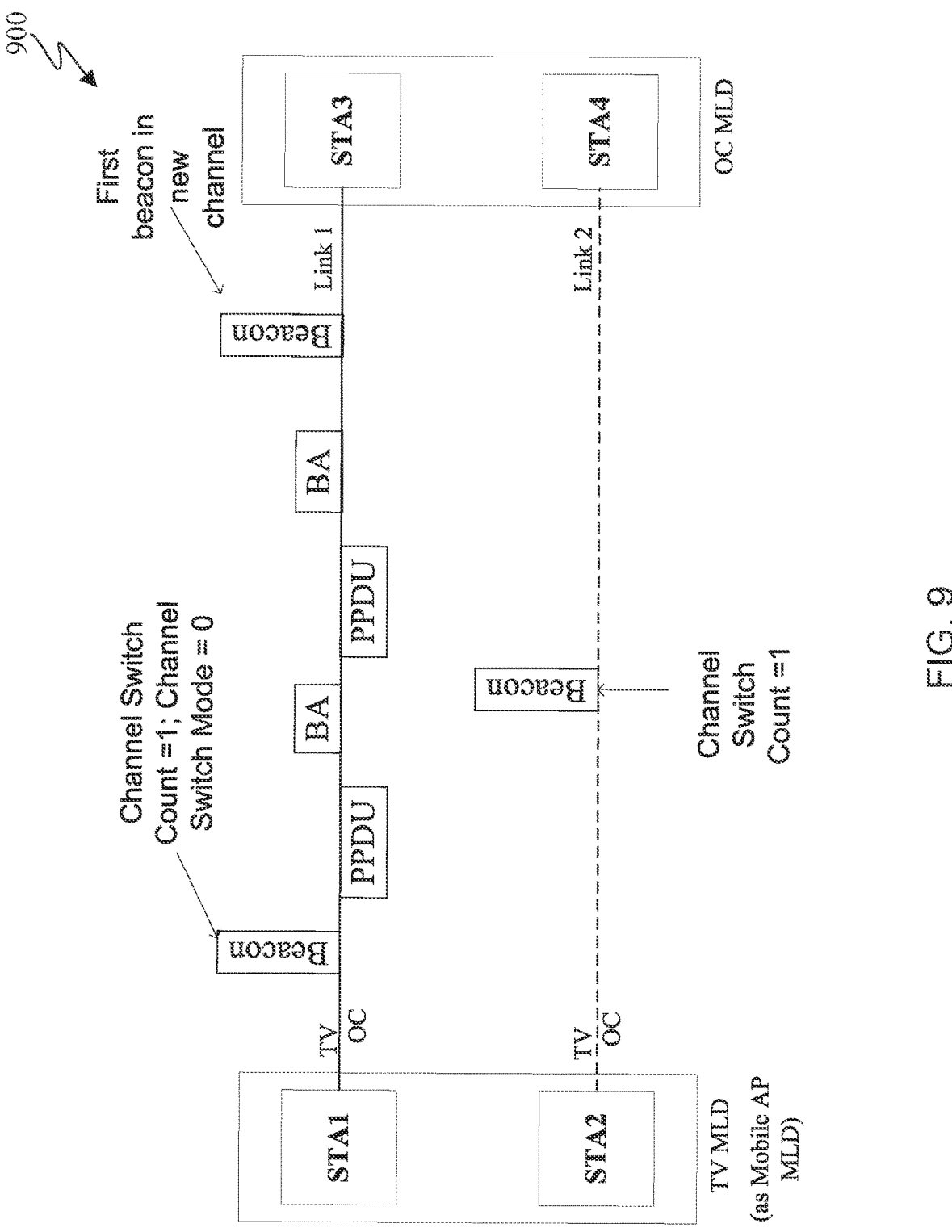
Figure 10:
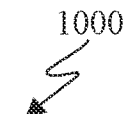
Figure 10:
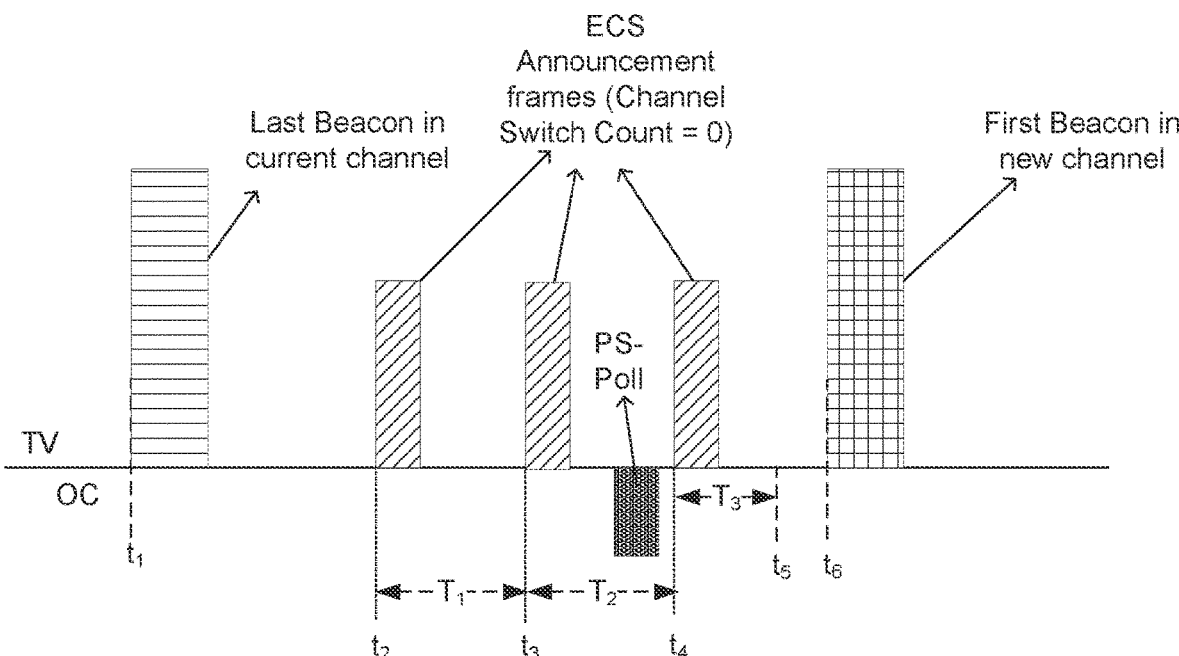
Figure 11:
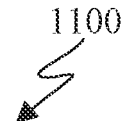
Figure 11:
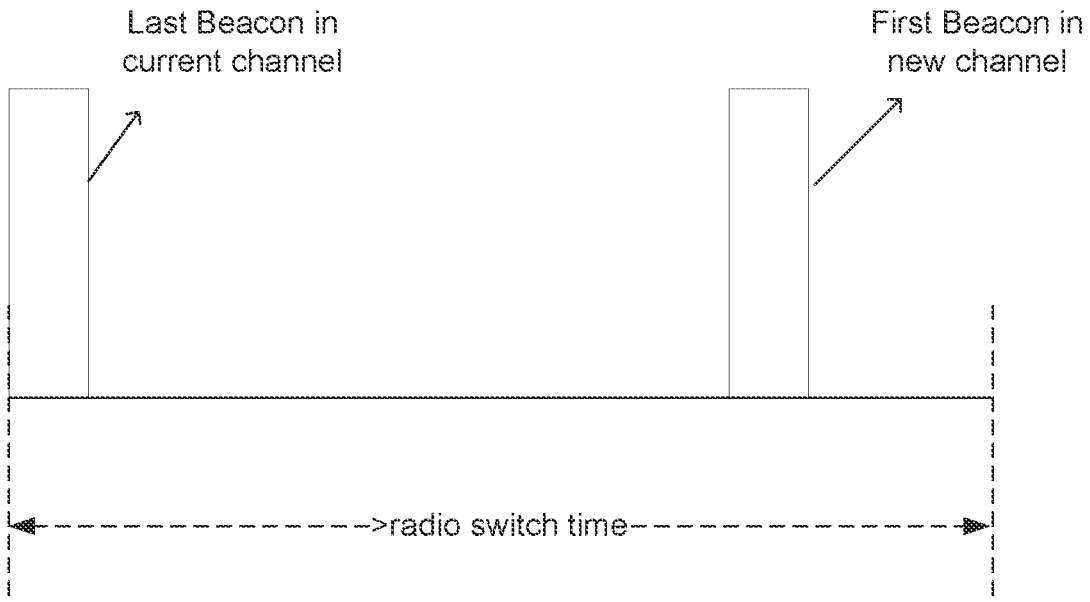
Figure 12:
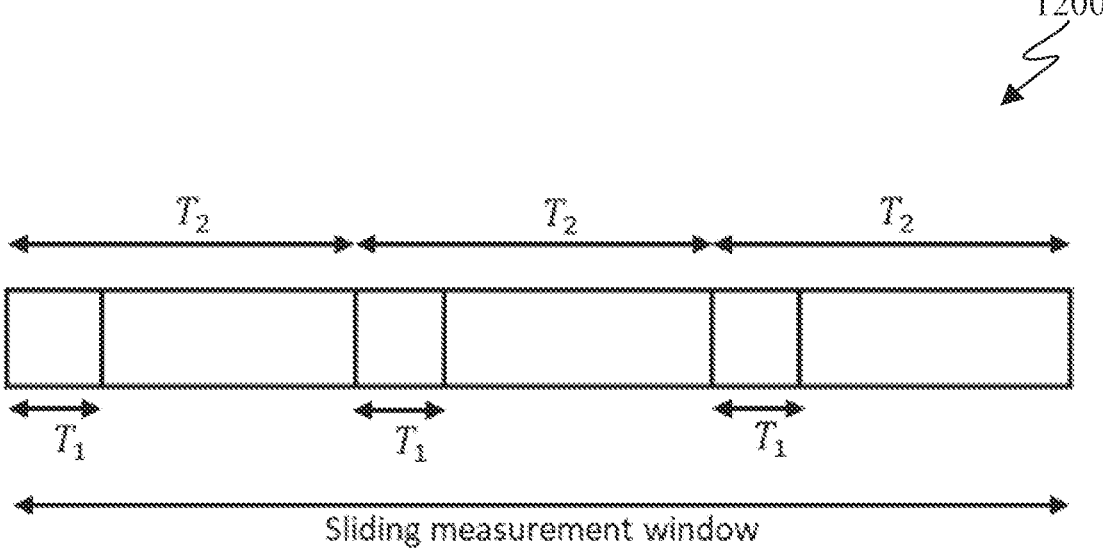
Figure 13:
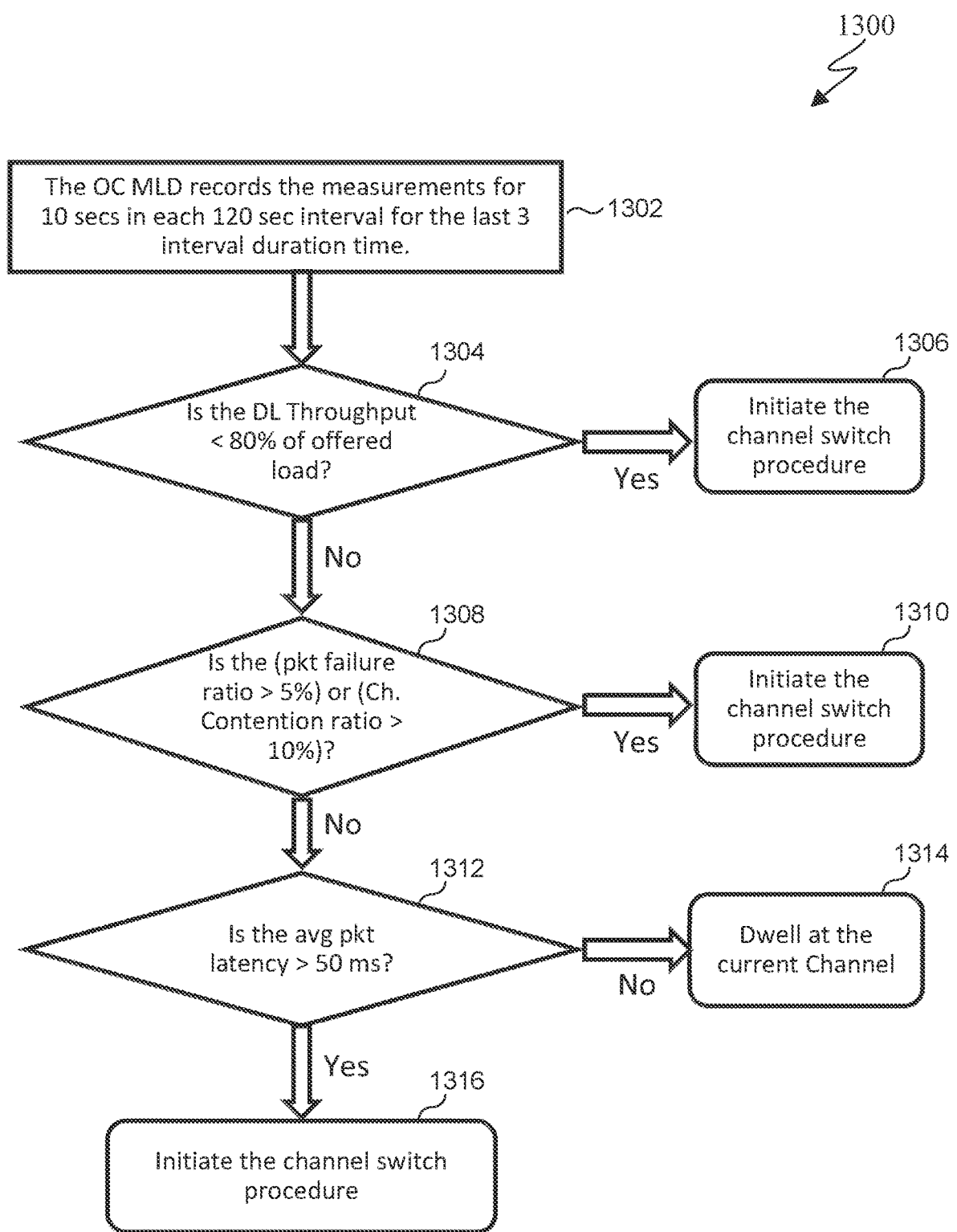
Figure 14:
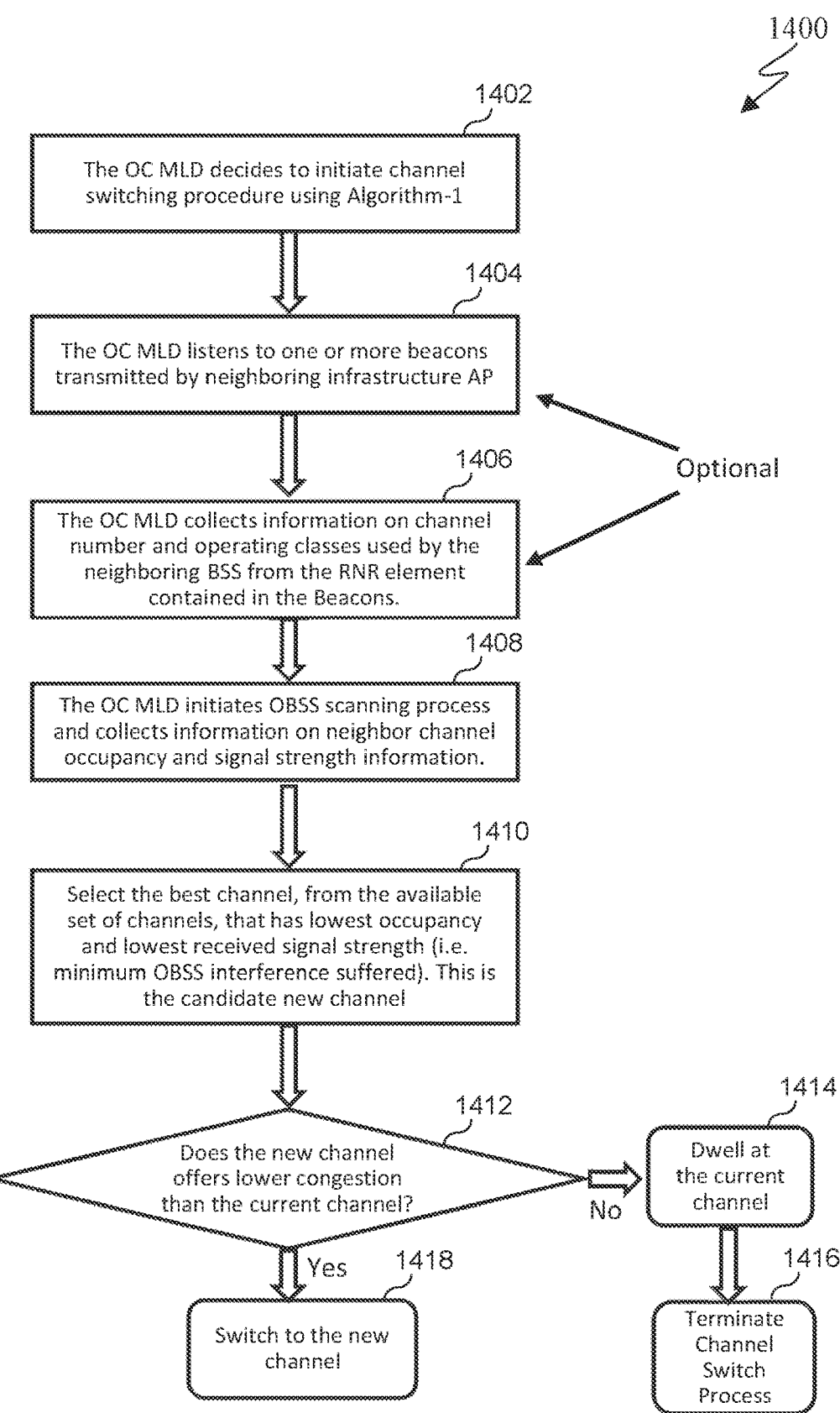

FIG. 2B illustrates an example STA according to embodi- ments of the present disclosure;

FIG. 3 illustrates an example format of a channel switch announcement element according to embodiments of this disclosure;

FIG. 4 illustrates an example format of an extended channel switch announcement element according to embodi- ments of this disclosure;

FIG. 5 illustrates an example of channel switching for MLDs according to embodiments of this disclosure;

FIG. 6 illustrates an example of a mobile AP MLD that is associated with a non-AP MLD that does not support an extended channel switching (ECS) procedure according to embodiments of this disclosure;

FIG. 7 illustrates an example of a mobile AP MLD that is associated with a non-AP MLD that supports an ECS procedure according to embodiments of this disclosure;

FIG. 8 illustrates an example of a mobile AP MLD that is associated with two non-AP MLDs where one of the non-AP MLDs supports an ECS procedure and the other non-AP MLD does not support an ECS procedure according to embodiments of this disclosure;

FIG. 9 illustrates an example of channel switching according to embodiments of the present disclosure;

FIG. 10 illustrates another example of channel switching according to embodiments of the present disclosure;

FIG. 11 illustrates an example switch time in the max channel switch time element being larger than the radio switch time according to embodiments of the present dis- closure;

FIG. 12 illustrates an example of a sliding measurement window according to embodiments of the present disclosure;

FIG. 13 illustrates a flowchart of a channel switch trig- gering method according to embodiments of the present disclosure;

FIG. 14 illustrates a flowchart of an example channel selection procedure according to embodiments of the present disclosure; and FIG. 15 illustrates a flowchart of a method for wireless communication performed by a non-AP device according to embodiments of the present disclosure.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will under- stand that the principles of the present disclosure may be implemented in any suitably arranged system or device.

The following documents and standards descriptions are hereby incorporated by reference into the present disclosure as if fully set forth herein: [1] IEEE P802.11be-D3.0"Part 11: Wireless LAN Medium Access Control (MAC) and Physical Layer (PHY) Specifications—Amendment 8: Enhancements for extremely high throughput (EHT)"; [2] IEEE P802.11REVme—D2.1"Part 11: Wireless LAN Medium Access Control (MAC) and Physical Layer (PHY) Specifications."

Embodiments of the present disclosure provide mecha- nisms for channel switching for multi-link devices.

Figure 1:
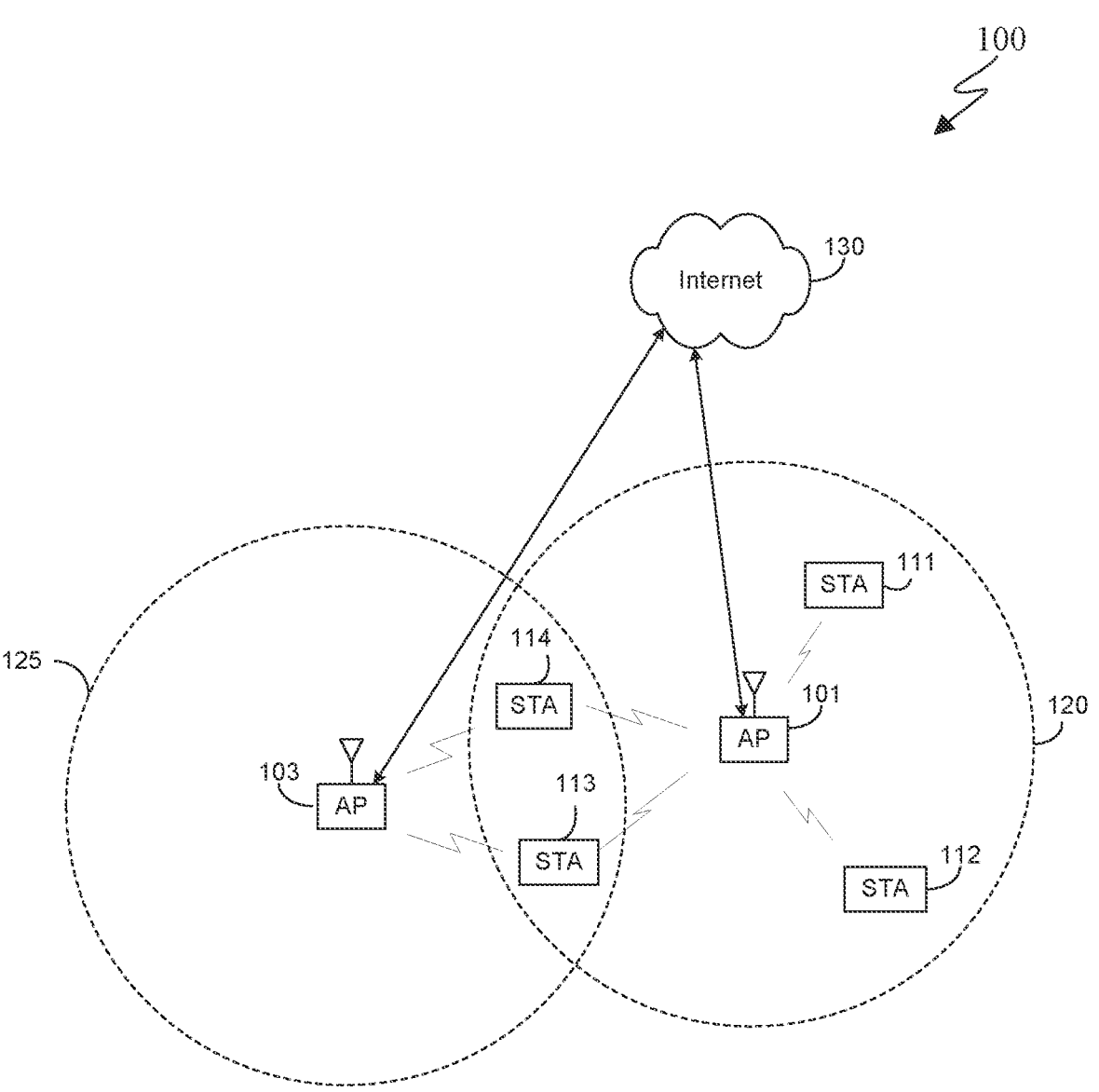
FIG. 1 illustrates an example wireless network according to embodiments of the present disclosure.

FIG. 1 illustrates an example wireless network 100 according to various embodiments of the present disclosure. The embodiment of the wireless network 100 shown in FIG.

1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming to facilitate channel switching for multi-link devices. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHZ, or 6 GHZ, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHZ, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating channel switching for multi-link devices. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming to facilitate channel switching for multi-link devices. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHZ, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHZ, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate channel switching for multi-link devices. In some embodiments, the controller/processor 240 includes at least one microprocessor or microcontroller.

The controller/processor 240 is also capable of executing other processes and programs resident in the memory 260, such as operations for facilitating channel switching for multi-link devices. The controller/processor 240 can move data into or out of the memory 260 as required by an executing process. In some embodiments, the controller/processor 240 is configured to execute a plurality of applications 262, such as applications for facilitating channel switching for multi-link devices. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touch-screen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Various embodiments of the present disclosure recognize that the latency requirement for many devices can be quite stringent. For example, a TV may have a latency requirement of 3 ms when communicating with its controller devices (OC). When these two devices operate on a link, if the first device decides to switch its operating channel, the corresponding channel switch operation or the extended channel switch operation may not be able to respect the latency requirement of that link. Methods need to be devised to ensure that channel switching becomes efficient and fast while satisfying any QoS requirements of the associated STAs operating on the affected link.

Accordingly, various embodiments of the present disclosure provide mechanisms and frameworks to render the channel switching procedure efficient and fast. This can be very useful for various modern device categories, e.g., improving a channel switching operation between a TV MLD and its operation module, an optimal channel MLD (OC MLD).

Channel switching is a procedure that allows an AP to change its operating channel in its BSS. The baseline specification [1] provides two mechanisms for channel switching—

1. Channel Switching Announcement (CSA) operation
2. Extended Channel Switch (ECS) operation FIG. 3 illustrates an example format of a Channel Switch Announcement element 300 according to embodiments of this disclosure The example format of the Channel Switch Announcement element 300 shown in FIG. 3 is for illustration only. Other embodiments of the example format of the Channel Switch Announcement element 300 could be used without departing from the scope of this disclosure.

The main element that is used to advertise the channel switch using the CSA procedure is the Channel Switch Announcement element, which the AP includes in the Beacon, Probe Response frames, and Channel Switch Announcement frames it transmits. This element contains information on the new channel to which the BSS will be switched to.

FIG. 4 illustrates an example format of an Extended Channel Switch Announcement element 400 according to embodiments of this disclosure The example format of the Extended Channel Switch Announcement element 400 shown in FIG. 4 is for illustration only. Other embodiments of the example format for the Extended Channel Switch Announcement element 400 could be used without departing from the scope of this disclosure.

The main element that is used to advertise the channel switch using the ECS procedure is the Extended Channel Switch Announcement element, which the AP includes in the Beacon, Probe Response frames, and Extended Channel Switch Announcement frames it transmits.

FIG. 5 illustrates an example of channel switching for MLDs 500 according to embodiments of this disclosure. The example of channel switching for MLDs 500 shown in FIG. 5 is for illustration only. Other embodiments of the example of channel switching for MLDs 500 could be used without departing from the scope of this disclosure.

IEEE 802.11be has extended the channel switch and extended channel switch procedure to multi-link operation. Essentially, if an AP affiliated with an AP MLD and operating on a first link intends to switch its operating channel, then the APs affiliated with the same AP MLD and operating on other links also advertise the information related to the channel switch on the corresponding links by including the Channel Switch Announcement and Extended Channel Switch Announcement elements corresponding to the channel switch in the Per-STA Profile corresponding to the AP operating on the affected link (the link whose channel is impending to be changed through channel switching procedure). This is illustrated in FIG. 5, where the AP MLD, which is a TV, is operating as a mobile AP MLD and the non-AP MLD is an OC MLD.

FIG. 6 illustrates an example of a mobile AP MLD that is associated with a non-AP MLD that does not support an ECS procedure 600 according to embodiments of this disclosure. The example of a mobile AP MLD that is associated with a non-AP MLD that does not support an ECS procedure 600 shown in FIG. 6 is for illustration only. Other embodiments of the example of a mobile AP MLD that is associated with a non-AP MLD that does not support an ECS procedure 600 could be used without departing from the scope of this disclosure.

According to one embodiment, a mobile AP MLD, for channel switching purposes, can support both the channel switch operation and the extended channel switch.

According to one embodiment, for the scenario where a first STA affiliated with a mobile AP MLD and operating on a first channel intends to switch the operating channel from the first channel to a second channel and the first STA determines that there none of the other STAs associated with the first STA and operating on the first channel support extended channel switch operation, then the first STA can advertise the channel switch using the Channel Switch procedure. According to this embodiment, the first STA can include a Channel Switch Announcement element in the Beacons, Probe Response frames, or Channel Switch Announcement frames it transmits. FIG. 6 illustrates this embodiment.

In FIG. 6, the TV MLD is operating as a mobile AP MLD and the non-AP MLD, the speaker, is associated with the TV MLD and operating on Link 1 that is operating on Channel 1. The non-AP MLD does not support the ECS mechanism.

Hence, for advertising a channel switching event, the TV MLD uses the CSA procedure.

According to another embodiment, for the scenario where a first STA affiliated with a mobile AP MLD and operating on a first channel intends to switch the operating channel from the first channel to a second channel, then the first STA can advertise the channel switch using the ECS operation if the first STA determines that all the STAs associated with the first STA and operating on the first channel supports extended channel switch operation. According to this embodiment, the first STA can include an ECS Announcement element in the Beacons, Probe Response frames, or ECS Announcement frames it transmits.

FIG. 7 illustrates an example of a mobile AP MLD that is associated with a non-AP MLD that supports an ECS procedure 700 according to embodiments of this disclosure. The example of a mobile AP MLD that is associated with a non-AP MLD that supports an ECS procedure 700 shown in FIG. 7 is for illustration only. Other embodiments of the example of a mobile AP MLD that is associated with a non-AP MLD that supports an ECS procedure 700 could be used without departing from the scope of this disclosure.

In FIG. 7, the TV MLD is operating as a mobile AP MLD and the non-AP MLD, the OC MLD, is associated with the TV MLD and operating on Link 1 that is operating on Channel 1. The non-AP MLD supports ECS mechanism. Hence, for advertising channel switching event, the TV MLD uses the ECS Announcement procedure.

According to another embodiment, for the scenario where a first STA affiliated with a mobile AP MLD and operating on a first channel intends to switch the operating channel from the first channel to a second channel, then the first STA can advertise the channel switch using the CSA operation even if the first STA determines that all the STAs associated with the first STA and operating on the first channel supports extended channel switch operation. According to this embodiment, the first STA can include a Channel Switch Announcement element in the Beacons, Probe Response frames, or Channel Switch Announcement frames it transmits.

FIG. 8 illustrates an example of a mobile AP MLD that is associated with two non-AP MLDs where one of the non-AP MLDs supports an ECS procedure and the other non-AP MLD does not support an ECS procedure 800 according to embodiments of this disclosure. The example of a mobile AP MLD that is associated with two non-AP MLDs where one of the non-AP MLDs supports an ECS procedure and the other non-AP MLD does not support an ECS procedure 800 shown in FIG. 8 is for illustration only. Other embodiments of the example of a mobile AP MLD that is associated with two non-AP MLDs where one of the non-AP MLDs supports an ECS procedure and the other non-AP MLD does not support an ECS procedure 800 could be used without departing from the scope of this disclosure.

According to one embodiment, for the scenario where a first STA affiliated with a mobile AP MLD and operating on a first channel intends to switch the operating channel from the first channel to a second channel and the first STA determines that there is at least one second STA associated with the first STA and operating on the first channel such that the second STA does not support the ECS procedure and there is at least one third STA associated with the first STA and operating the on the first channel such that the third STA supports the ECS procedure, then the first STA can advertise the channel switch using both the channel switch procedure and the extended channel switch operation. According to this embodiment, the first STA can include an Extended Channel Switch Announcement element in the Beacons, Probe Response frames, or Extended Channel Switch Announcement frames it transmits.

In FIG. 8, the TV MLD is operating as a mobile AP MLD and the first non-AP MLD, the speaker, is associated with the TV MLD and operating on Link 1 that is operating on Channel 1. The first non-AP MLD doesn't support ECS mechanism. A second non-AP MLD, the OC MLD, is also associated with the TV MLD, where the OC MLD supports the ECS mechanism. Hence, for advertising channel switching event, the TV MLD uses both the ECS Announcement procedure and the CSA procedure.

According to one embodiment, when a first STA affiliated with a mobile AP MLD intends to switch its operating channel from a first channel to a second channel, then the first STA may select the second channel such that all the STAs associated with the first STA also support operating on the second channel. According to another embodiment, while selecting the second channel, the first STA may consider some priority information related to one or more of the STAs associated with the first STA. For example, in reference to FIG. 8, the TV MLD may put higher prioritization on the OC MLD's supported channel than the Speaker's supported channel—e.g., if the TV MLD determines that second channel is supported by the OC MLD and choosing the second channel results in faster channel switch than choosing any other channel, then the TV MLD may select the second channel for channel switch even though the speaker may not support operating on the second channel. For channel switching, according to one embodiment, the TV MLD may not select a new channel that is not supported by the OC MLD on the affected link.

TV MLD's Support for Channel Switching:

According to one embodiment, the Mobile AP MLD may support both the CSA operation and the ECS Announcement operation. If the TV MLD is operating as a Mobile AP MLD, then the TV MLD can categorize its support in the following cases—

Case-1: For the case where only the OC MLD is associated with the TV MLD (typical scenario), the TV MLD advertises an impending channel switch event corresponding to an operating link (the affected link) using the ECS procedure only.

Case-2: For the case where other devices along with the OC MLD are associated with the TV MLD and operating on the affected link and all the devices operating on the affected link support ECS operation, the TV MLD advertises an impending channel switch event corresponding to the affected link using the ECS procedure only.

Case-3: For the case where there is at least one other device associated with the TV MLD and operating on the affected link along with the OC MLD, where the device does not support ECS operation, the TV MLD advertises an impending channel switch event corresponding to the affected link using both the CSA operation and ECS operation.

OC MLD's Support for Channel Switching:

According to one embodiment, the OC MLD can support the ECS operation.

According to another embodiment, the OC MLD can support the CSA operation.

According to another embodiment, the OC MLD can support both the CSA and ECS operations.

According to one embodiment, the OC MLD provides to the TV MLD, for each of the links the OC MLD operates on, a list of channels that the OC MLD can operate on the corresponding link. Such information can be provided during association or reassociation phase by including Supported Channels element in the (Re)Association Request frame.

According to one embodiment, OC MLD provides to the TV MLD, for each of the links the OC MLD operates on, a list of operating classes that the OC MLD supports on the corresponding link. Such information can be provided during association or reassociation phase by including Supported Operating Classes element in the (Re)Association Request frame. Considerations for selecting channels:

According to one embodiment, the TV MLD, for selecting the new channel, considers the related information received from its associated devices through—

Supported Channel element

Supported Operating Class element

Any other measurement undertaken by either the TV MLD or the OC MLD or other devices associated with the TV MLD (if any)

According to one embodiment, the TV MLD selects the channel that is supported by the maximum number of its associated devices operating on the affected link.

According to one embodiment, the TV MLD does not switch to a channel/operating class that is not supported by the OC MLD.

According to one embodiment, the TV MLD, for selecting a new channel, considers any regulation related constraints for operating on the new channel.

Efficient channel switching operation:

The objective of the efficient channel switching is to ensure that the 3 ms latency requirement between the OC MLD and the TV MLD on the affected link is not violated.

The TV MLD can advertise the channel switch using Beacons, Probe Response frames, Channel Switch Announcement frames or Extended Channel Switch Announcement frames.

For conveying the channel switch information to the OC MLD faster, the TV MLD considers the OC MLD's power saving state (e.g., TWT) and, if needed, prioritizes over other associated STAs' power saving state.

According to one embodiment, depending on the radio switch time for the TV MLD and the OC MLD, two methods can be adopted for efficient channel switching and ensure $<\mu$ms latency. These are described below for case-1.

FIG. 9 illustrates an example of channel switching 900 according to embodiments of the present disclosure. The example of channel switching 900 shown in FIG. 9 is for illustration only. Other embodiments of the example of channel switching 900 could be used without departing from the scope of this disclosure. The example illustrated in FIG. 9 allows more switch time.

Method-1: Allowing More Switch Time

The TV MLD sets the Channel Switch Mode field in the Extended Channel Switch Announcement element included in the Beacon frames transmitted on the initial channel of the affected link to 0. The Channel Switch Mode field in the Extended Channel Switch Announcement element included Per-STA Profile corresponding to the affected link and transmitted on the other link is also be set to 0.

The Channel Switch Count field of the Extended Channel Switch Announcement element is set to the value (x+1), where x is the minimum value of the TBTT that ensures the reception of the Extended Channel Switch Announcement element by the OC MLD.

X can be selected based on channel condition (e.g., RSSI) between the OC MLD and the TV MLD. Poor channel condition may require larger x (higher number of TBBT); whereas smaller x (smaller number of TBTT) may be sufficient for better link condition.

The OC MLD orients its radio on the affected link to the new channel before the Channel Switch Count field reaches the value 0.

The Switch Time field of the Max Channel Switch Time element included in the beacon frame transmitted on the affected link or carried on the corresponding Per-STA profile on the other link is commensurate with the radio switch time of the TV MLD and the OC MLD and must be $<\mu$ ms.

FIG. 10 illustrates another example of channel switching 1000 according to embodiments of the present disclosure. The example of channel switching 1000 shown in FIG. 10 is for illustration only. Other embodiments of the example of channel switching 1000 could be used without departing from the scope of this disclosure. The example illustrated in FIG. 10 allows for faster switching.

Method-2: Fast switch

The Channel Switch Count field in the Extended Channel Switch Announcement element in the Beacon frame transmitted on the initial channel of the affected link is set to 0. The Channel Switch Count field in the Extended Channel Switch Announcement element included Per-STA Profile corresponding to the affected link and transmitted on the other link is also set to 0. This will prompt the STA on the affected link to be awake.

After transmission of the beacon frame, the TV MLD transmits multiple Extended Channel Switch Announcement frames to ensure that the OC MLD has received the notification of the impending channel switch. The OC MLD on the affected link can send a PS-Poll frame to indicate it's awake.

The TV MLD can transmit the Extended Channel Switch Announcement frames without performing a backoff, after determining that the WM is idle for one PIFS duration. [Ref: [1]-Clause 11.9.3.2 (Selecting and advertising a new channel in an infrastructure BSS)].

Immediately after ensuring that the OC MLD has received the channel switch information, the TV MLD switches to the new channel.

Immediately after receiving the channel switch information from the TV MLD, the OC MLD switches to the new channel.

The OC MLD shall not transmit any frame on the new channel until it receives a frame from the TV MLD on the new channel.

FIG. 11 illustrates an example switch time in the max channel switch time element being larger than the radio switch time 1100 according to embodiments of the present disclosure. The example of switch time in the max channel switch time element being larger than the radio switch time 1100 shown in FIG. 11 is for illustration only. Other embodiments of the example switch time in the max channel switch time element being larger than the radio switch time 1100 could be used without departing from the scope of this disclosure.

According to one embodiment, the Switch Time in the Max Channel Switch Time element has to be greater than the radio switch time—the minimum time needed to orient the radio operating on the affected link to the new channel. This is illustrated in FIG. 11.

According to one embodiment, the TV MLD can have concurrent connection with both the infrastructure AP MLD and the OC MLD. According to another embodiment, the OC MLD can have concurrent connection with both the infrastructure AP MLD and the TV MLD. The Following is presented for the configuration where the OC MLD is operating as the Mobile AP MLD. According to another embodiment, the TV MLD can also operate as the Mobile AP MLD. The procedures below in that case are the mirror of the one where OC MLD is the mobile AP MLD.

Triggering Channel Condition:

The decision on whether or not to switch the current operating channel is made by the OC MLD (operating as mobile AP MLD)

For triggering the channel switch event, the OC MLD takes into account different parameters that would comprehensively reflect the channel congestion or link quality information. These parameters are—

Channel Utilization: percentage of channel time used for transmission and own reception Contention Ratio: percentage of time used in contending for the channel Packet Failure Ratio: (No. of pkts transmitted–No. of pkts successfully delivered)/No. of pkts transmitted DL Throughput: (No. of pkts successfully delivered*size of each pkts)/time duration; (here DL means from OC to TV)

UL Throughput: (no. of pkts successfully received*size of each pkts)/time duration; (here UL means from TV to OC)

RSSI: Received signal strength measured by the TV MLD. RSSI is a measure of link quality between the TV and the OC.

Average Pkt Latency:

$$\frac{\sum_{i=1}^{N} L_i}{N};$$

where N=number of pkts delivered within the measurement window; $L_i$=latency of the i-th pkt (=time the pkt is successfully decoded at the receiver-time the pkt was queued at the transmitter)

Average user perceived throughput (UPT):

$$\frac{\sum_{i=1}^{N} \left(\frac{S_i}{L_i}\right)}{N};$$

where $S_i$=size of the i-th pkt

The above parameters are measured for a given time duration and their moving average is recorded.

Measurement is taken every $T_2$ (e.g., 120 sec) interval; each time for a $T_1$ (10 sec) duration.

Measurement is recorded for the last N (3) time segments, each with $T_2$ duration. Sliding measurement window =$NT_2$ as illustrated in FIG. 12.

FIG. 12 illustrates an example of a sliding measurement window 1200 according to embodiments of the present disclosure. The embodiment of the example sliding measurement window 1200 shown FIG. 12 is for illustration only. Other embodiments of the example sliding measurement window 1200 could be used without departing from the scope of this disclosure.

Algorithm outline:

The channel switch condition-generating algorithm can be developed utilizing the measured channel parameters described in the previous slide.

The objective function is formulated using any number of combinations of the factors described above depending on the nature of the system goal. For example, a throughput requirement may prioritize more on the overall system throughput than putting stringent packet failure ration requirement.

A sample channel-switch trigger algorithm is shown in Algorithm 1, where DL Throughput (highest priority given), Avg Pkt latency, and pkt failure ratio are used as criteria for channel switch.

AI-ML-Assisted Channel Switching:

More sophisticated algorithms can be developed using machine learning. For example, channel switching triggering can be framed as a reinforcement learning problem where the Reward function can be a function of one or more channel parameters (e.g., weighted sum of DL and UL throughput, or negative latency), and Action can be either to stay at the current channel or to switch to a new channel.

FIG. 13 illustrates a flowchart of a channel switch triggering method 1300 according to embodiments of the present disclosure. The embodiment of the channel switch triggering method 1300 shown FIG. 13 is for illustration only. Other embodiments of the channel switch triggering method 1300 could be used without departing from the scope of this disclosure.

As illustrated in FIG. 13, the method 1300 begins at step 1302, where the OC MLD records the measurements for 10 seconds in each 120 second interval for the last 3 interval duration time. At step 1304, a determination is made whether the DL throughput is <80% of the offered load. If the DL throughput is <80% of the offered load, then at step 1306, the channel switch procedure is initiated. If the DL throughput is not <80% of the offered load, then at step 1308, a determination is made whether the packet failure ratio is >5% or the channel contention ratio is >10%. If the packet failure ratio is >5% or the channel contention ratio is >10%, then at step 1310, the channel switch procedure is initiated. If the packet failure ratio is not >5% and the channel contention ratio is not >10%, then at step 1312, a determination is made whether the average packet latency is >50 ms. If the average packet latency is not >50 ms, then at step 1314, the current channel is dwelled upon. If the average packet latency is >50 ms, then at step 1316, the channel switch procedure is initiated.

Optimal Channel Selection:

In order to select the best available channel and operating classes for the channel switch, the OC MLD needs to know information about its neighborhood channels.

The OC MLD can collect the neighborhood channel information in the following ways—

Scanning (support is mandatory):

The OC MLD is required to perform channel (OBSS) scanning before it initiates any channel switching procedure.

Through scanning, the TV MLD will collect information on channel number, operating classes, activity levels, and signal strength for each of the active neighboring BSS Optionally, as part of scanning process, the OC MLD may also listen to beacons from one or more BSS(s) and extract the information contained in Reduced Neighbor Report (RNR) elements in the beacons. The RNR would contain the neighboring occupancy information.

Channel Usage Procedure (support is optional) [1]:

Using Channel Usage Procedure, the OC MLD can receive guidance from the infrastructure AP MLD on conducive channel(s) and operating class(es) to which the OC MLD can switch its operating channel.

Since the OC MLD is not associated with the infrastructure AP, in order to receive the channel usage information from the infrastructure AP, the OC MLD sends Probe Request frame with Supported Operating Classes and Channel Usage elements included Channel Usage Request frame to the infra-AP MLD requesting for guidance on channel selection.

The AP MLD responds by sending the Probe Response frame Channel Usage Response frame that would carry one or more Channel Usage elements containing the suggested set of conducive channels the OC MLD can use for operating as a mobile AP MLD.

Upon receiving the neighborhood channel information, the OC MLD can select the best available channel for channel switch. One example algorithm is shown in the flow chart.

If none of the available channels is better than the current channel, channel switch process can be terminated.

FIG. 14 illustrates a flowchart of an example channel selection procedure 1400 according to embodiments of the present disclosure. The embodiment of the channel selection procedure 1400 shown FIG. 14 is for illustration only. Other embodiments of the channel selection procedure 1400 could be used without departing from the scope of this disclosure.

As illustrated in FIG. 14, the procedure 1400 begins at step 1402, where the OC MLD decides to initiate the channel switching procedure described above and as illustrated in FIG. 13. At step 1404 (which is optional), the OC MLD listens to one or more beacons transmitted by neighboring infrastructure AP. At step 1406 (which is optional), the OC MLD collects information on channel number and operating classes used by the neighboring BSS from the RNR element contained in the beacons. At step 1408, the OC MLD initiates an OBSS scanning process and collects information on neighbor channel occupancy and signal strength information. At step 1410, the best channel is selected, from the available set of channels, that has the lowest occupancy and lowest received signal strength (i.e., minimum OBSS interference suffered). This is the candidate new channel. At step 1412, a determination is made whether, the new channel offers lower congestion than the current channel. If the new channel does not offer lower congestion than the current channel, then at step 1414, the current channel is dwelled upon, and at step 1416, the channel switch process is terminated. If the new channel offers lower congestion than the current channel, then at step 1418, a switch is made to the new channel.

API Needed from the Wi-Fi Chipset

For Channel-Switch Triggering:

For every 120 sec interval segments, the following measurements need to be undertaken for 10 sec duration. The information needs to be provided for the last 3 time segments in a sliding window manner.
Channel Utilization Ratio
Contention Ratio
Packet Failure Ratio:
DL Throughput:
UL Throughput
RSSI:
Average Pkt Latency:
Average user perceived throughput (UPT)
For channel selection The chipset should be able to receive a first indication message that would trigger the chipset to collect information on neighboring channels.

Upon receiving the first indication message, the chipset provides the following information
Scan results:
a. Identified neighboring channels and operating classes
b. Congestion level info: airtime occupancy ratio for a 30 sec time window
c. Signal strength information for each of the active BSS
RNR information The chipset is able to receive a second indication message that would trigger the chipset to initiate channel switch procedure to switch the operating channel to the new channel as indicated in the second indication message.

FIG. 15 illustrates a flowchart of a method 1500 for wireless communication performed by a non-AP device according to embodiments of the present disclosure. The embodiment of the example method 1500 shown in FIG. 15 is for illustration only. Other embodiments of the example method 1500 could be used without departing from the scope of this disclosure.

As illustrated in FIG. 15, the method 1500 begins at step 1502, where the non-AP device communicates, via a first STA, over a link with a corresponding AP of an AP MLD. At step 1504, the non-AP MLD receives information associated with a channel switching operation from the AP MLD, the information based on data associated with a moving average of one or more parameters that are associated with channel congestion or link quality. At step 1506, the non-AP MLD determines, based on the information, to initiate the channel switching operation, wherein a first STA of the non-AP MLD will switch from a first channel to a second channel on a first link. At step 1508, the non-AP MLD instructs the first STA of the non-AP MLD to communicate with a first AP of the AP MLD on the second channel over the first link when communication over the second channel would be improved compared to communication over the first channel. At step 1510, the non-AP MLD instructs the first STA of the non-AP MLD to continue communicating with the first AP of the AP MLD on the first channel over the first link when communication over the second channel would not be improved compared to communication over the first channel.

In one embodiment, the one or more parameters comprises channel utilization, contention ratio, packet failure ratio, downlink throughput, uplink throughput, received signal strength indicator, average packet latency, or average user perceived throughput.

In one embodiment, the channel switching operation is based on a channel selection procedure associated with neighborhood channels of the AP MLD.

In one embodiment, the channel selection procedure is based on overlapping basic service set scanning.

In one embodiment, the channel switching operation is based on both an ECS procedure and a channel switching (CS) procedure when: there is at least one second AP of the AP MLD associated with the first AP of the AP MLD and operating on the first channel such that the second AP of the AP MLD does not support the ECS procedure, and there is at least one third AP of the AP MLD associated with the first AP of the AP MLD and operating on the first channel such that the third AP of the AP MLD supports the ECS procedure.

In one embodiment, the information is based on channel selection information associated with a channel that is supported by a largest number of APs of the AP MLD operating on a link whose channel is impending to be changed via the channel switching operation.

In one embodiment, a power saving state of one or more STAs of the non-AP MLD is prioritized over power saving states of STAs other than STAs of the non-AP MLD.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An access point (AP) multi-link device (MLD) (AP MLD), comprising:
  access points (APs), each comprising a transceiver configured to communicate over a link with a corresponding station (STA) of a non-AP MLD; and
  a processor operably coupled to the transceiver, the processor configured to:
    obtain information associated with a channel switching operation, the information including data associated with a moving average of one or more parameters that are associated with channel congestion or link quality;
    determine, based on the information, to initiate the channel switching operation, wherein a first AP of the AP MLD will switch from a first channel to a second channel on a first link;
    instruct the first AP of the AP MLD to communicate with a first STA of the non-AP MLD on the second channel over the first link when communication over the second channel would be improved compared to communication over the first channel; and
    instruct the first AP of the AP MLD to continue communicating with the first STA of the non-AP MLD on the first channel over the first link when communication over the second channel would not be improved compared to communication over the first channel.

2. The AP MLD of claim 1, wherein the one or more parameters comprises channel utilization, contention ratio, packet failure ratio, downlink throughput, uplink throughput, received signal strength indicator, average packet latency, or average user perceived throughput.

3. The AP MLD of claim 1, wherein the channel switching operation includes a channel selection procedure associated with neighborhood channels of the AP MLD.

4. The AP MLD of claim 3, wherein the channel selection procedure includes overlapping basic service set scanning.

5. The AP MLD of claim 1, wherein the channel switching operation comprises both an extended channel switching (ECS) procedure and a channel switching (CS) procedure when:
  there is at least one second AP associated with the first AP and operating on the first channel such that the second AP does not support the ECS procedure, and
  there is at least one third AP associated with the first AP and operating on the first channel such that the third AP supports the ECS procedure.

6. The AP MLD of claim 1, wherein the information includes channel selection information associated with a channel that is supported by a largest number of APs of the AP MLD operating on a link whose channel is impending to be changed via the channel switching operation.

7. The AP MLD of claim 6, wherein the processor is configured to prioritize a power saving state of one or more STAs of the non-AP MLD over power saving states of STAs other than STAs of the non-AP MLD.

8. A non-access point (AP) multi-link device (MLD) (non-AP MLD), comprising:
  stations (STAs), each comprising a transceiver configured to communicate over a link with a corresponding AP of an AP MLD; and
  a processor operably coupled to the transceiver, the processor configured to:
    receive, via at least one of the transceivers, information associated with a channel switching operation from the AP MLD, the information based on data associated with a moving average of one or more parameters that are associated with channel congestion or link quality;
    determine, based on the information, to initiate the channel switching operation, wherein a first STA of the non-AP MLD will switch from a first channel to a second channel on a first link;
    instruct the first STA of the non-AP MLD to communicate with a first AP of the AP MLD on the second channel over the first link when communication over the second channel would be improved compared to communication over the first channel; and
    instruct the first STA of the non-AP MLD to continue communicating with the first AP of the AP MLD on the first channel over the first link when communication over the second channel would not be improved compared to communication over the first channel.

9. The non-AP MLD of claim 8, wherein the one or more parameters comprises channel utilization, contention ratio, packet failure ratio, downlink throughput, uplink throughput, received signal strength indicator, average packet latency, or average user perceived throughput.

10. The non-AP MLD of claim 8, wherein the channel switching operation is based on a channel selection procedure associated with neighborhood channels of the AP MLD.

11. The non-AP MLD of claim 10, wherein the channel selection procedure is based on overlapping basic service set scanning.

12. The non-AP MLD of claim 8, wherein the channel switching operation is based on both an extended channel switching (ECS) procedure and a channel switching (CS) procedure when:
  there is at least one second AP of the AP MLD associated with the first AP of the AP MLD and operating on the first channel such that the second AP of the AP MLD does not support the ECS procedure, and

US 12,604,246 B2

21 there is at least one third AP of the AP MLD associated
with the first AP of the AP MLD and operating on the
first channel such that the third AP of the AP MLD
supports the ECS procedure.

13. The non-AP MLD of claim 8, wherein the information
is based on channel selection information associated with a
channel that is supported by a largest number of APs of the
AP MLD operating on a link whose channel is impending to
be changed via the channel switching operation.

14. The non-AP MLD of claim 13, wherein a power
saving state of one or more STAs of the non-AP MLD is
prioritized over power saving states of STAs other than
STAs of the non-AP MLD.

15. A method for wireless communication performed by
a non-access point (AP) multi-link device (MLD) that
comprises stations (STAs), the method comprising:

communicating, via a first STA, over a link with a
corresponding AP of an AP MLD;

receiving information associated with a channel switching
operation from the AP MLD, the information based on
data associated with a moving average of one or more
parameters that are associated with channel congestion
or link quality;

determining, based on the information, to initiate the
channel switching operation, wherein a first STA of the
non-AP MLD will switch from a first channel to a
second channel on a first link;

instructing the first STA of the non-AP MLD to commu-
nicate with a first AP of the AP MLD on the second
channel over the first link when communication over
the second channel would be improved compared to
communication over the first channel; and instructing the first STA of the non-AP MLD to continue
communicating with the first AP of the AP MLD on the first channel over the first link when communication
over the second channel would not be improved com-
pared to communication over the first channel.

16. The method of claim 15, wherein the one or more
parameters comprises channel utilization, contention ratio,
packet failure ratio, downlink throughput, uplink through-
put, received signal strength indicator, average packet
latency, or average user perceived throughput.

17. The method of claim 15, wherein the channel switch-
ing operation is based on a channel selection procedure
associated with neighborhood channels of the AP MLD.

18. The method of claim 17, wherein the channel selection
procedure is based on overlapping basic service set scan-
ning.

19. The method of claim 15, wherein the channel switch-
ing operation is based on both an extended channel switch-
ing (ECS) procedure and a channel switching (CS) proce-
dure when:

there is at least one second AP of the AP MLD associated
with the first AP of the AP MLD and operating on the
first channel such that the second AP of the AP MLD
does not support the ECS procedure, and there is at least one third AP of the AP MLD associated
with the first AP of the AP MLD and operating on the
first channel such that the third AP of the AP MLD
supports the ECS procedure.

20. The method of claim 15, wherein the information is
based on channel selection information associated with a
channel that is supported by a largest number of APs of the
AP MLD operating on a link whose channel is impending to
be changed via the channel switching operation.

* * * * *